(12) United States Patent
Wells et al.

(10) Patent No.: US 12,590,482 B1
(45) Date of Patent: Mar. 31, 2026

(54) SLIDING WINDOW ASSEMBLY WITH FLUSH-CLOSING MOVING PANEL

(71) Applicant: Aisin Corporation, Kariya (JP)

(72) Inventors: Alexander P. Wells, New Hudson, MI (US); Joel Thomas Runyan, Canton, MI (US)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/903,616

(22) Filed: Oct. 1, 2024

(51) Int. Cl.
*E05D 15/10* (2006.01)
*B60J 1/18* (2006.01)
*E05F 15/646* (2015.01)

(52) U.S. Cl.
CPC ......... *E05D 15/1047* (2013.01); *B60J 1/1853* (2013.01); *E05D 2015/1055* (2013.01); *E05F 15/646* (2015.01); *E05Y 2900/55* (2013.01)

(58) Field of Classification Search
CPC .................................................. B60J 1/1853
See application file for complete search history.

(56) References Cited

U.S. PATENT DOCUMENTS

| | | | | |
|---|---|---|---|---|
| 5,799,444 | A * | 9/1998 | Freimark | B60J 1/1853 49/213 |
| 6,324,788 | B1 * | 12/2001 | Koneval | B60J 1/1853 49/121 |
| 7,437,852 | B2 * | 10/2008 | Dufour | E05F 11/535 49/213 |

| | | | | |
|---|---|---|---|---|
| 7,464,501 | B2 * | 12/2008 | Arimoto | E05F 15/646 49/210 |
| 7,584,574 | B2 * | 9/2009 | Kinross | E05D 15/0621 49/413 |
| 7,641,265 | B2 * | 1/2010 | Seiple | B60J 1/1853 49/413 |
| 7,789,450 | B2 | 9/2010 | Seiple et al. | |
| 8,186,103 | B2 * | 5/2012 | Grimm | E05D 15/1042 49/213 |
| 8,469,437 | B2 * | 6/2013 | Zanetti | E05F 15/632 49/404 |
| 8,562,063 | B2 * | 10/2013 | Giret | E05D 15/1047 296/146.15 |

(Continued)

FOREIGN PATENT DOCUMENTS

| | | | | |
|---|---|---|---|---|
| DE | 202025102440 | U1 * | 5/2025 | B60J 1/1853 |
| EP | 1688574 | B1 | 6/2012 | |

(Continued)

*Primary Examiner* — Catherine A Kelly
(74) *Attorney, Agent, or Firm* — Sughrue Mion, PLLC

(57) ABSTRACT

Embodiments described herein relate to window assemblies. In one embodiment, a window assembly includes a fixed panel defining an opening and a rail that attaches to the fixed panel. The window assembly also includes a guide provided on the rail and defining grooves. The window assembly also includes a shoe at least partially overlapping the guide and defining slots. The window assembly further includes a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening.

18 Claims, 7 Drawing Sheets

(56)                    References Cited

U.S. PATENT DOCUMENTS

| | | | | |
|---|---|---|---|---|
| 8,813,425 B2 * | 8/2014 | Ash, Jr. | ................. | E05D 15/06 |
| | | | | 49/380 |
| 9,027,282 B2 * | 5/2015 | Schreiner | .............. | B60J 1/1853 |
| | | | | 49/213 |
| 9,487,065 B2 * | 11/2016 | Bender | ..................... | B60J 1/16 |
| 9,797,177 B2 * | 10/2017 | Gipson | ................ | E05F 11/488 |
| 10,434,845 B2 | 10/2019 | Murasawa et al. | | |
| 10,518,611 B2 | 12/2019 | Murasawa et al. | | |
| 10,882,382 B2 | 1/2021 | Otsubo | | |
| 11,208,834 B2 * | 12/2021 | Kuroda | ................ | E05F 15/646 |
| 11,261,633 B2 | 3/2022 | Kuroda et al. | | |
| 11,365,562 B2 * | 6/2022 | Giroux | ................ | E06B 3/4609 |
| 2007/0234644 A1 * | 10/2007 | Jaeger | ................... | E05D 15/10 |
| | | | | 49/362 |
| 2017/0253108 A1 * | 9/2017 | Gipson | ................. | B60S 1/026 |
| 2025/0163741 A1 * | 5/2025 | Nee | ........................... | B60J 1/16 |

FOREIGN PATENT DOCUMENTS

| | | | | | |
|---|---|---|---|---|---|
| FR | 2833213 A1 * | 6/2003 | ......... | E05D 15/1047 |
| FR | 2910519 A1 * | 6/2008 | .......... | E05D 15/101 |
| GB | 2556360 A * | 5/2018 | ............ | E05D 15/10 |
| JP | H07305558 A * | 11/1995 | ............... | B60J 1/16 |

* cited by examiner

FIG. 1A
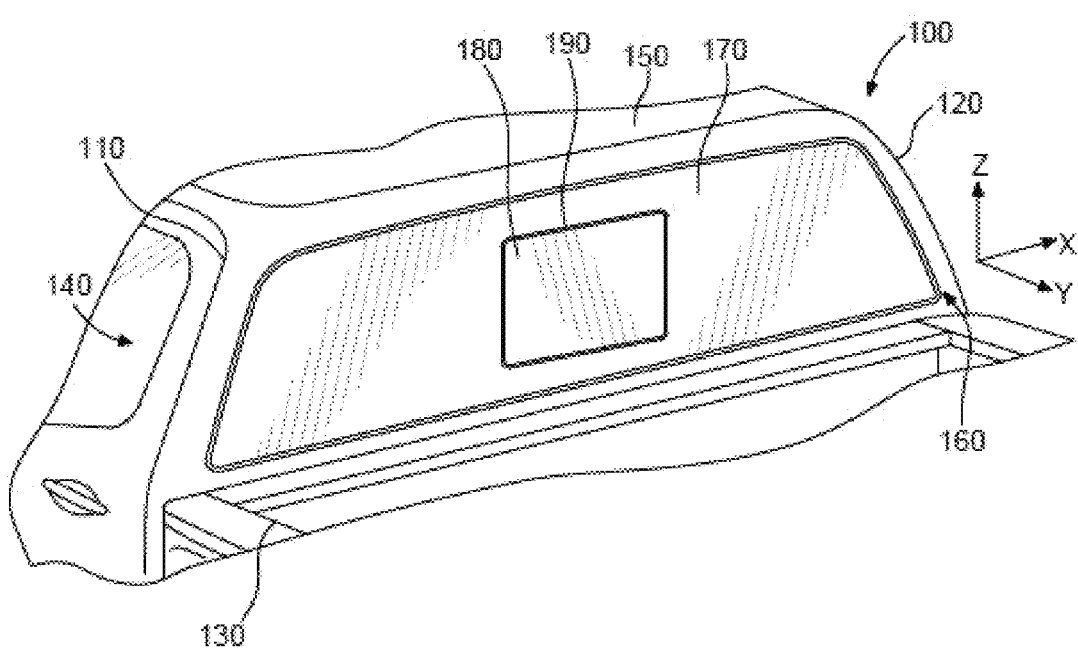
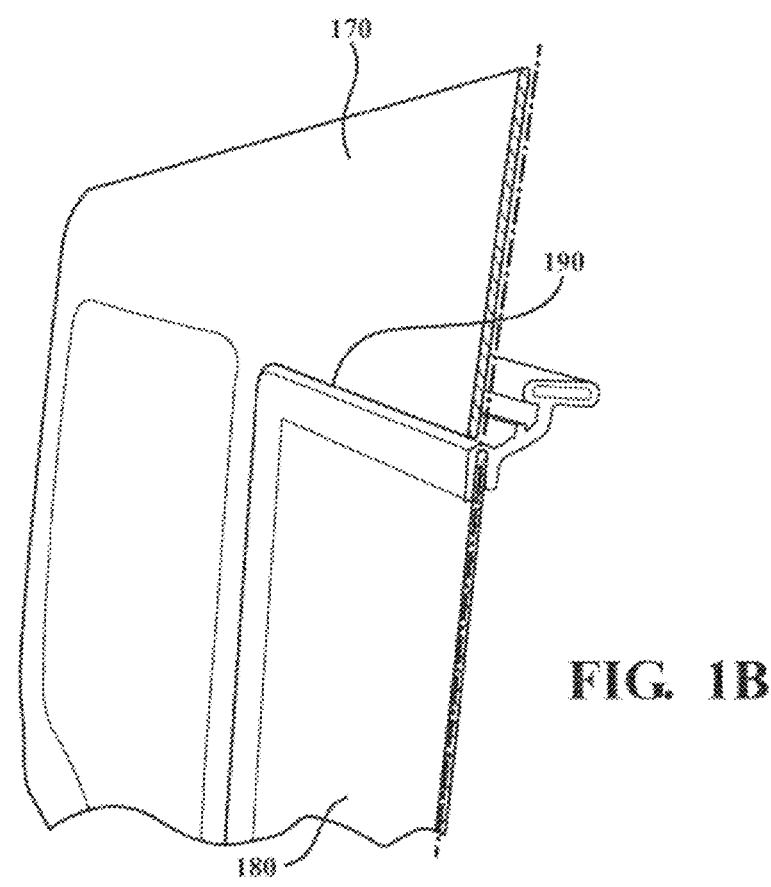
FIG. 1B

SLIDING WINDOW ASSEMBLY WITH FLUSH-CLOSING MOVING PANEL

TECHNICAL FIELD

The subject matter described herein relates, in general, to window assemblies and, more particularly, to sliding window assemblies for vehicles.

BACKGROUND

Some vehicles include window assemblies that open and close in a sliding manner. In some of these vehicles, the window assembly includes a fixed panel attached to the vehicle and a moving panel that slides behind the fixed panel to open the window. When the moving panel slides to close the window, the moving panel sits offset from the fixed panel. In other words, the moving panel is slightly closer to the fore of the vehicle than the fixed panel. Such arrangements can cause issues with the window assembly, including a decreased aesthetic appearance of the window assembly, gaps between the moving panel and fixed panel that cause leaking of air or other environmental elements into a passenger compartment of the vehicle, and/or pinching or stickiness in the components that move the moving panel.

SUMMARY

Example systems and other embodiments relate to sliding window assemblies. As previously noted, some window assemblies suffer from various difficulties. For example, some window assemblies have moving panels that do not sit flush with the remainder of the window assembly, which can cause aesthetic as well as mechanical issues. Thus, in at least one arrangement, a window assembly is provided that includes a flush-closing moving panel. By way of closing flush with the remainder of the window assembly, the moving panel enhances the aesthetic appearance of the window assembly, reduces opportunity for gaps between the moving panel and the remainder of the window assembly, and generally eliminates pinching and/or stickiness in the movement of the moving panel.

In one embodiment, a window assembly includes a fixed panel defining an opening and a rail that attaches to the fixed panel. The window assembly also includes a guide provided on the rail and defining grooves. The window assembly also includes a shoe at least partially overlapping the guide and defining slots. The window assembly further includes a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening.

In another embodiment, a window assembly includes a fixed panel defining an opening and a rail that attaches to the fixed panel. The window assembly also includes a guide provided on the rail and defining grooves having substantially equal depths within the guide. The window assembly also includes a shoe at least partially overlapping the guide and defining slots including a first slot and a second slot. The first slot and the second slot define different shapes. The window assembly further includes a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening.

In yet another embodiment, a window assembly includes a fixed panel defining an opening and a rail that attaches to the fixed panel. The window assembly also includes a guide provided on the rail and defining grooves including a first groove and a second groove. The window assembly also includes a shoe at least partially overlapping the guide and defining slots facing away from the panel. The slots include a first C-shaped slot overlapping the first groove and a second L-shaped slot overlapping the second groove. The window assembly further includes a moving panel supported by the shoe by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening. The pins include a first pin that slides within the first groove and the first slot and a second pin that slides within the second groove and the second slot.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

FIG. 1A illustrates one example of a back side of a sliding window assembly.

FIG. 1B illustrates one example of a flush-closing moving panel of a window assembly.

DETAILED DESCRIPTION

Figures 2A, 2B:
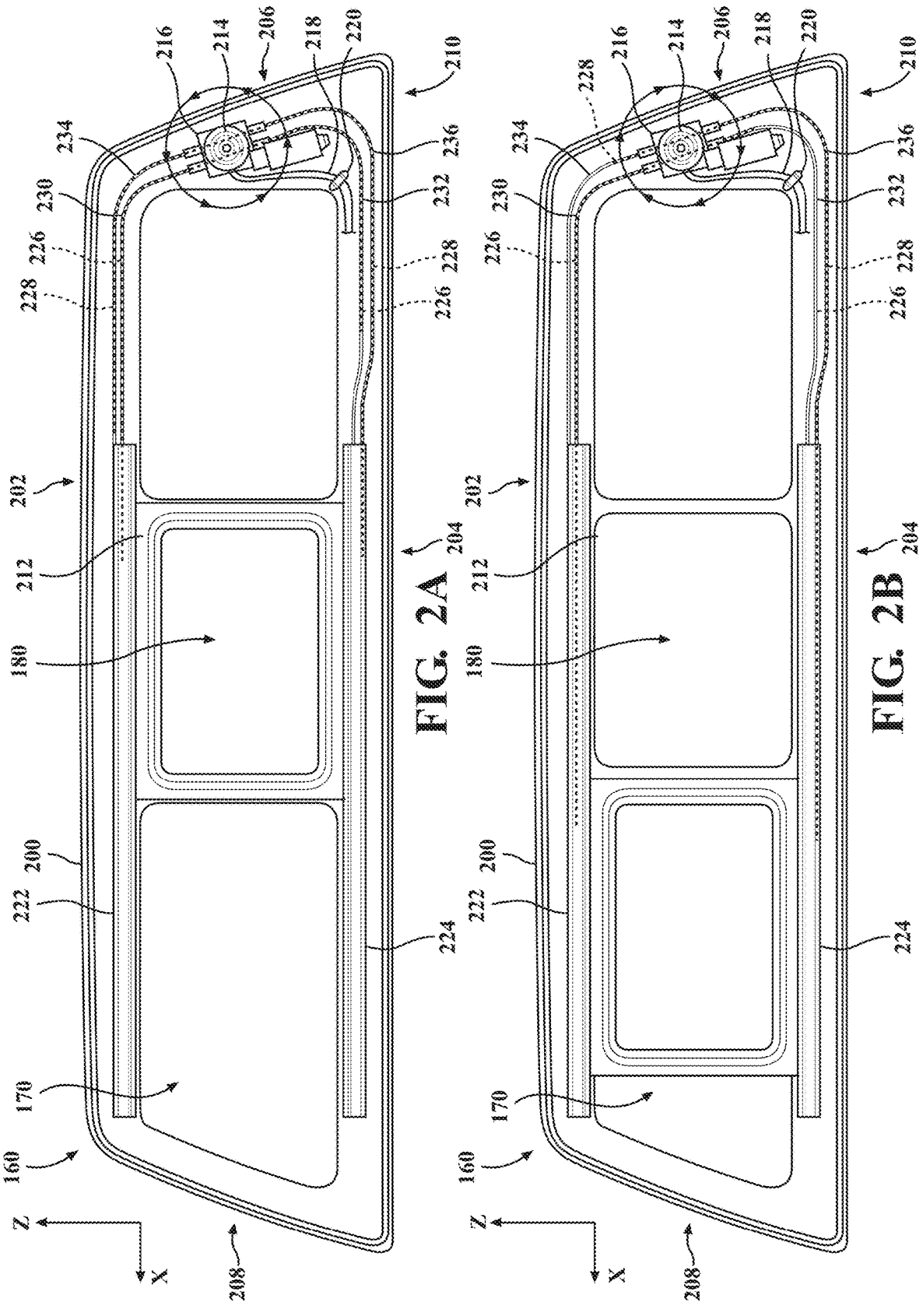
FIG. 2A illustrates one example of a front side of a window assembly showing the window assembly in a closed state.
FIG. 2B illustrates one example of a front side of a window assembly showing the window assembly in a closed state.

Systems and other embodiments associated with a window assembly for a vehicle are disclosed. As previously noted, some window assemblies suffer from various difficulties. For example, some window assemblies have moving panels that do not sit flush with the remainder of the window assembly, which can cause aesthetic as well as mechanical issues. Thus, in at least one arrangement, a window assembly is provided that includes a flush-closing moving panel. By way of closing flush with the remainder of the window assembly, the moving panel enhances the aesthetic appearance of the window assembly, reduces opportunity for gaps between the moving panel and the remainder of the window assembly, and generally eliminates pinching and/or stickiness in the movement of the moving panel.

Referring now to FIG. 1A, a portion of a vehicle 100 is shown. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes windows, and thus benefits from the functionality discussed herein associated with sliding window assemblies. As shown in FIG. 1A, the vehicle 100 is a pickup truck with a driver side 110 and a passenger side 120. In instances in which the vehicle 100 is a left-hand drive vehicle, the driver side 110 is the side of the vehicle 100 on which the driver sits, and the passenger side 120 is the side of the vehicle 100 opposite the driver side 110. However, the driver side 110 and passenger side 120 may be flipped in another arrangement. In any case, as used herein, the vehicle 100 is generally a left-hand drive vehicle. Among other components of the pickup truck, the pickup truck includes a bed 130, a passenger compartment 140, a roof 150, and a window assembly 160. In one embodiment, for example, as shown, the window assembly 160 is a rear, sliding window assembly 160 for the pickup truck. As used herein, "rear" indicates that the window assembly 160 faces toward the bed 130. However, in other embodiments, the window assembly 160 is oriented along a side of the vehicle 100, such as on the driver side 110 or the passenger side 120.

The window assembly 160 includes one or more panels. In one embodiment, the panels are glass panels. In other embodiments, the panels are plexiglass, plastic, acrylic, or another material suitable for use as a window. In other words, the panels can be formed of a substantially clear and/or transparent material that closes off the passenger compartment 140 while allowing light to pass through and creating visibility out of the vehicle 100 for passengers within the vehicle 100. It should be understood that the panels can be formed of the same material, or the panels can be formed of different materials. Moreover, the panels are generally thin, planar components that are substantially flat or slightly curved.

In one implementation, for example, as shown in the FIGS. 1A and 1B, the window assembly 160 includes a fixed panel 170 and a moving panel 180. As used herein, "fixed" indicates that the fixed panel 170 does not substantially move with respect to the vehicle 100. In one arrangement, the fixed panel 170 is attached to the vehicle 100 and defines an opening 190. As shown, the opening 190 is located substantially centrally within the fixed panel 170. However, in other arrangements, the opening 190 can be located elsewhere with respect to the fixed panel 170 (e.g., the opening 190 can be located closer to one side of the vehicle 100 than another side of the vehicle 100).

The moving panel 180, in one example, moves with respect to the fixed panel 170 to block and unblock the opening 190. In other words, the moving panel 180 moves to open and close the opening 190 of the window assembly 160. When the window assembly 160 is in a closed state, for example, as shown in FIGS. 1A, 1B, and 2A, the moving panel 180 fully or substantially covers the opening 190 to block the opening 190 from air, water, and other environmental elements passing through the opening 190. When the window assembly 160 is in an open state, for example, as shown in FIG. 2B, the moving panel 180 does not substantially cover the opening 190, or the moving panel 180 completely unblocks the opening 190 to allow air, water, and other environmental elements to pass through the opening 190.

With additional reference now to FIG. 1B, when the window assembly 160 is in the closed state, the moving panel 180 is substantially flush with the fixed panel 170 (e.g., the moving panel 180 closes flush with the fixed panel 170). More specifically, when the window assembly 160 is in the closed state, the moving panel 180 is located in substantially the same plane as the fixed panel 170. In one instance, the central axes of the planes are about 0 mm apart in the general y-direction. In other words, the moving panel 180 and the fixed panel 170 appear as one continuous panel when the window assembly 160 is in the closed state. As a result, the window assembly 160 has an appealing aesthetic appearance. For example, window assembly 160, in the closed state, appears as one continuous panel, and the moving panel 180 is not easily recognizable. As described in further detail below, the window assembly 160 includes a drive system that enables the moving panel 180 to close flush with the fixed panel 170.

Referring back to the fixed panel 170, with reference now to FIGS. 2A and 2B, the fixed panel 170 defines a perimeter 200. The perimeter 200, in one example, is an edge of the fixed panel 170 substantially surrounding the fixed panel 170. In some instances, the fixed panel 170 is attached to the vehicle 100 at the perimeter 200. Moreover, in one arrangement, the perimeter 200 has a top edge 202, a bottom edge 204, a first side edge 206, a second side edge 208. In one arrangement, as described herein, the top edge 202 is located adjacent to the roof 150, and the bottom edge 204 is located opposite the top edge 202 (e.g., adjacent to the bed 130). Moreover, in one arrangement, as described herein, the first side edge 206 is located on the driver side 110, and the second side edge 208 is located opposite the first side edge 206 (e.g., on the passenger side 120). However, in other arrangements, the first side edge 206 can be located on the passenger side 120, and the second side edge 208 can be located on the driver side 110. The fixed panel 170 also defines a back side and a front side 210. As referred to herein, the back side is seen from outside of the vehicle 100 (e.g., the back side faces the bed 130), and the front side 210 is seen from the inside of the vehicle 100 (e.g., the front side 210 faces the passenger compartment 140). However, in other arrangements, the back side faces the passenger compartment 140, and the front side 210 faces the bed 130.

Referring back to the moving panel 180, as mentioned above, the moving panel 180 moves with respect to the fixed panel 170. As described in further detail below, in one embodiment, the moving panel 180 slides with respect to the fixed panel 170. More specifically, in one arrangement, the moving panel 180 slides in a direction of the first side edge 206 and the second side edge 208. In one example, the moving panel 180 moves from the opening 190 toward the first side edge 206 and back to the opening 190. In another example the moving panel 180 moves from the opening 190 toward the second side edge 208 and back to the opening 190. In other words, the moving panel 180 generally moves in a lateral direction of the vehicle 100 (e.g., substantially along the x-axis of FIG. 1A). In some instances, the placement of the opening 190 within the fixed panel 170 and/or the direction of movement of the moving panel 180 are chosen by an original equipment manufacturer (OEM) of the vehicle 100. The OEM may choose these features based on the type of vehicle 100, the construction process of the vehicle 100, customer demands, and/or other factors.

To facilitate movement of the moving panel 180, in some instances, the window assembly 160 includes a frame 212 for the moving panel 180. The frame 212 houses the moving panel 180 and connects the moving panel 180 to the remainder of the window assembly 160. As described in further detail below, the frame 212 can help to facilitate movement of the moving panel 180. In one approach, the frame 212 is a plastic, injection molded part that substantially surrounds an edge of the moving panel 180. In another approach, the frame 212 does not surround the edge of the moving panel 180, and instead, is attached to only one side of the moving panel 180, for example, by adhesive. As such, the frame 212 not only facilitates movement of the moving panel 180, but also helps to protect the moving panel 180 from damage.

As mentioned above, the window assembly 160 also includes a drive system. The drive system includes drive components that are operable to move the moving panel 180 such that the moving panel 180 sits flush with the fixed panel 170 in the closed position. To do so, the drive system includes one or more components that are operable to move the moving panel 180 in multiple directions. More specifically, the drive system is operable to move the moving panel 180 substantially in the y-direction such that the moving panel 180 slides toward and away from the opening 190. The drive system is also operable to move the moving panel 180 substantially in the x-direction such that the moving panel 180 slides and passes by the fixed panel 170. In other words, the drive system is operable to slide the moving panel 180 both substantially parallel to the fixed panel 170 and substantially perpendicular to the fixed panel 170. In one implementation, when the window assembly 160 is in the closed state, the drive system is operable to slide the moving panel 180 away from the opening 190 generally in the y-direction to unblock the opening and create a clearance for the moving panel 180 to pass by the fixed panel 170 generally in the x-direction such that the window assembly 160 is in the open state. Contrariwise, in one implementation, when the window assembly 160 is in the open state, the drive system is operable to slide the moving panel 180 to pass by the fixed panel 170 generally in the x-direction toward the opening 190, and the drive system is operable to slide the moving panel 180 into the opening 190 generally in the y-direction to block the opening 190 such that the window assembly is in the closed state. Further details of the drive system components will now be described in greater detail.

In one embodiment, as shown in FIGS. 2A and 2B, the drive system includes a motor 214, cables, and rails. In one arrangement, the moving panel 180 is supported by the rails, the cables are directly or indirectly connected to the moving panel 180, and the motor 214 operates the cables to slide the moving panel 180 along the rails. In one implementation, as described in further detail below, the drive system interfaces with the moving panel 180, for example, via the frame 212, to slide the moving panel 180. Each drive component as well as the operation of the drive system will be described in further detail below.

As shown in the figures, the motor 214 is mounted to the fixed panel 170. In one example, the motor 214 is adhered to the fixed panel 170. In another example, the motor 214 is located in a motor housing 216, and the motor housing 216 is attached to the fixed panel 170. The motor housing 216, in one embodiment, is attached to the fixed panel 170 by adhesive (in other words, the motor housing 216 is adhered to the fixed panel 170). The motor 214 can be attached to the motor housing 216 by threaded fasteners, in one example. The motor 214 (and likewise, the motor housing 216), is attached to the fixed panel 170 between the top edge 202 and the bottom edge 204. As shown, the motor 214 is mounted to the fixed panel 170 substantially equidistant to the top edge 202 and the bottom edge 204. However, in other arrangements, the motor 214 can be mounted to the fixed panel 170 closer to one of the top edge 202 and the bottom edge 204. Moreover, in some instances, the motor 214 is mounted to the fixed panel 170 adjacent to one of the first side edge 206 and the second side edge 208. More specifically, the motor 214 can be mounted to the fixed panel 170 about a few inches offset from the first side edge 206 or the second side edge 208. As shown in the figures, the motor 214 is mounted to the fixed panel 170 adjacent to the first side edge 206.

To provide power to the motor 214 once the window assembly 160 is installed to the vehicle 100, the window assembly 160 also includes, in one arrangement, a wire harness 218. The wire harness 218, in one example, is attached to the motor 214 and electrically connects the motor 214 to electronic components (e.g., controller, power source, etc.) of the vehicle 100. In one embodiment, the wire harness 218, before installation to the vehicle 100, is attached to the fixed panel 170. For example, the wire harness 218 can be attached to the fixed panel 170 with a clip 220 or another fastener before the window assembly 160 is installed to the vehicle 100. Other methods of attaching the wire harness 218 to the fixed panel 170 include adhesion, tape, etc.

Referring now to the rails, in one embodiment, the window assembly 160 includes a top rail 222 and a bottom rail 224. As shown, the top rail 222 is located adjacent to the top edge 202, and the bottom rail 224 is located adjacent to the bottom edge 204. The rails 222/224 are attached to the front side 210 of the fixed panel 170, for example, by adhesion. The rails 222/224 extend along the top edge 202 and the bottom edge 204 substantially along the x-axis. In one arrangement, for example, as shown, the rails 222/224 span a portion of the top edge 202 and the bottom edge 204. The rails 222/224 can be formed of metal, plastic, or another material with suitable rigidity to support the moving panel 180 as the moving panel 180 slides along the rails 222/224. Moreover, the rails 222/224 can be substantially identical in one or more aspects (e.g., in length, size, material, etc.), or the top rail 222 and the bottom rail 224 can be different in one or more aspects.

Referring now to the cables, in one embodiment, the window assembly 160 includes a top cable 226 and a bottom cable 228. In the arrangement shown, the top cable 226 is disposed within the top rail 222, and the bottom cable 228 is disposed within the bottom rail 224. Moreover, in one implementation, the top cable 226 is located closer to a central area of the fixed panel 170, while the bottom cable 228 is located closer to the perimeter 200. However, in other arrangements, the top cable 226 can be located closer to the perimeter 200, and the bottom cable 228 can be located closer to the central area of the fixed panel 170. In either case, the cables 226/228 are connected, directly and/or indirectly, to the motor 214 and the moving panel 180 and are operable by the motor 214 to slide the moving panel 180 along the rails 222/224. More specifically, in one arrangement, the cables 226/228 are connected to the motor 214 and to the frame 212. In one example, the cables 226/228 define a grooves, and the motor 214 includes a toothed drive gear that drives the cables 226/228 by the grooves. However, the motor 214 and the cables 226/228 can interface in other manners as well. Additionally, in one arrangement, the motor 214 rotates clockwise and/or counterclockwise to operate the cables 226/228 in a push-pull manner to slide the moving panel 180.

With continued reference to FIGS. 2A and 2B, operating the motor 214 in a pushing manner slides the moving panel 180 toward the first side edge 206 to unblock the opening 190, while operating the motor 214 in a pulling manner slides the moving panel 180 toward the opening 190. However, it should be understood that the push-pull manner can be reversed. For example, in another arrangement, operating the motor 214 in a pulling manner slides the moving panel 180 toward the first side edge 206 to unblock the opening 190, while operating the motor 214 in a pushing manner slides the moving panel 180 toward the opening 190. The direction of the push-pull operation may be decided by the OEM.

The cables 226/228, in one embodiment, extend toward the rails 222/224 substantially following the perimeter 200 and offset from the perimeter 200. As such, the cables 226/228 generally follow the perimeter 200 so that the cables 226/228 do not substantially interfere with the viewing area through the fixed panel 170. In some instances, the cables 226/228 are generally flexible, and accordingly, the cables 226/228 need to be directed to follow the paths shown in the figures. As such, in one embodiment, the window assembly 160 can include tubes. The tubes can house the cables 226/228 and direct the cables 226/228 from the motor housing 216 to the rails 222/224. In one example, the window assembly 160 includes a first tube 230, a second tube 232, a third tube 234, and a fourth tube 236. As shown, the first tube 230 houses a portion of the top cable 226, the second tube 232 houses the remainder of the top cable 226, the third tube 234 houses a portion of the bottom cable 228, and the fourth tube 236 houses the remainder of the bottom cable 228. However, it should be understood that the tubes 230-234 can house the cables 226/228 in other manners. In any case, the tubes 230-234 can be substantially rigid and hollow such that the tubes 230-234 place the cables 226/228 in the arrangements shown in the figures while the cables 226/228 can slide within the tubes 230-234. More specifically, in one arrangement, the tubes 230-234 extend between the motor housing 216 and the rails 222/224, following the perimeter 200 and offset from the perimeter 200. Moreover, as mentioned above, the motor 214 can be housed in a motor housing 216. Accordingly, in one implementation, the cables 226/228 are configured to pass through the motor housing 216 such that the cables 226/228 can contact the motor 214. Accordingly, the cables 226/228 extend from the rails 222/224, through the tubes 230-234, and into the motor housing 216.

As mentioned above, the drive system is operable to slide the moving panel 180 in multiple directions. As described above, the drive system is operable to slide the moving panel 180 along the rails 222/224 in generally the x-direction and substantially parallel to the fixed panel 170. Additionally, the drive system is operable to slide the moving panel 180 in generally the y-direction and substantially perpendicular to the fixed panel 170. Accordingly, in addition to the motor 214, the cables 226/228, and the rails 222/224, the drive system includes one or more other components that facilitate movement of the moving panel 180 in multiple directions. These components will be described in further detail below.

Figures 3A, 3B:
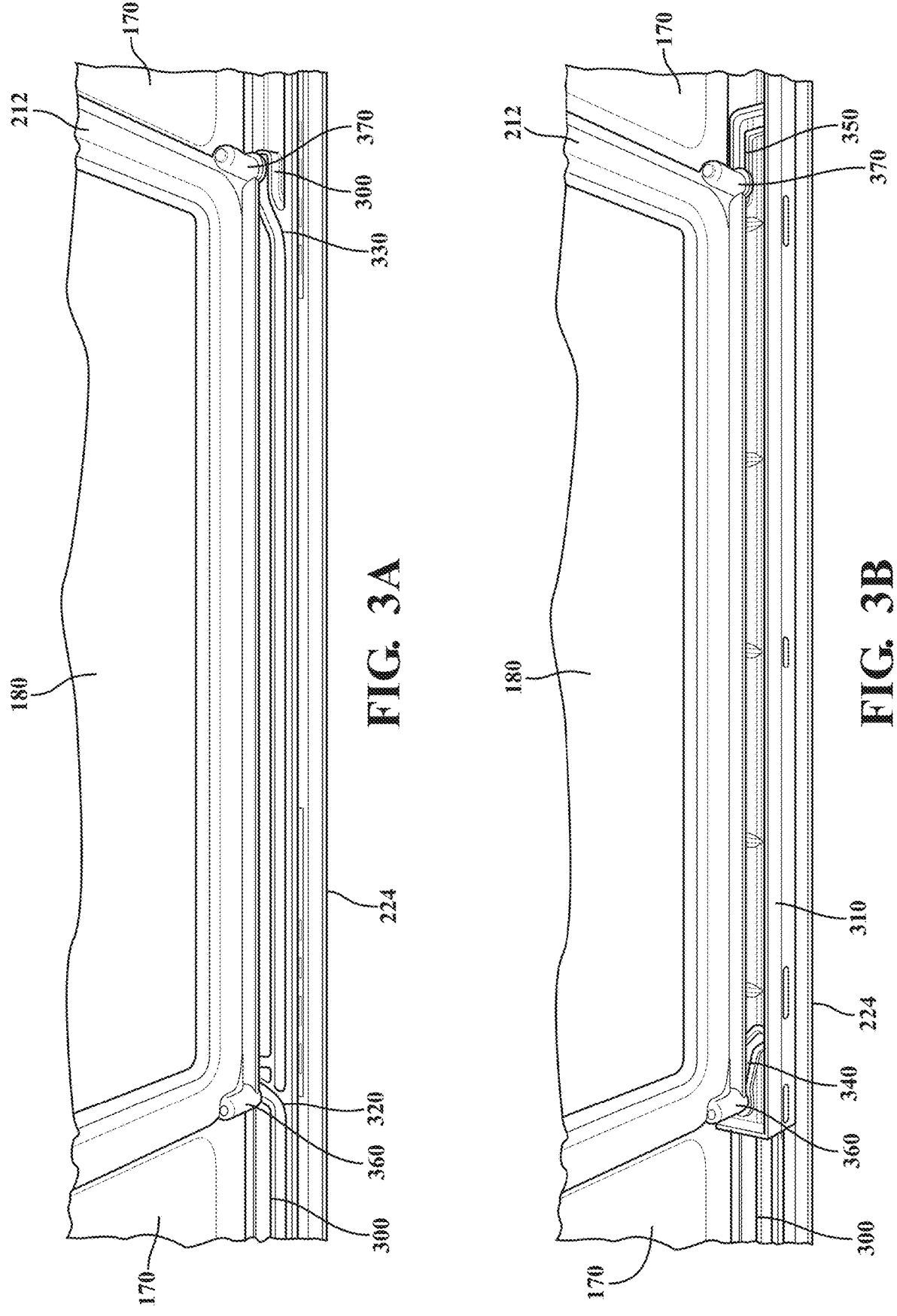
FIG. 3A illustrates one example of a rail and a guide for a window assembly.
FIG. 3B illustrates one example of a shoe for a window assembly.

Referring now to FIGS. 3A and 3B, a close-up view of a portion of the bottom rail 224 and the moving panel 180 is shown. In one implementation, the window assembly 160 includes a guide 300 and a shoe 310 (FIG. 3B). The guide 300 and the shoe 310 function together to dictate the movement of the moving panel 180. In one arrangement, the guide 300 is provided on the bottom rail 224 and includes grooves that guide the moving panel 180 as the moving panel 180 slides in the direction of the bottom rail 224. As shown in FIG. 3A, the grooves include a first groove 320 and a second groove 330. The first groove 320 can be located closer to the second side edge 208 of the fixed panel 170 than the second groove 330, and the second groove 330 can be located closer to the first side edge 206 than the first groove 320. Further details of the grooves 320/330 will be described in further detail below in connection with FIGS. 4A and 4B.

In one implementation, the guide 300 is an injection molded or 3D-printed component that is manufactured separately from the bottom rail 224 and attached to the bottom rail 224. The guide 300 can be attached to the bottom rail 224 by adhesive, by a snap-fit configuration, by fasteners, or other attachment methods. Manufacturing the guide 300 separately from the bottom rail 224 can be advantageous if the guide300 and the bottom rail 224 are formed from different materials. For example, the guide 300 can be injection molded from plastic, resin, etc., while the bottom rail 224 is formed from metal such as steel. In another implementation, the guide 300 and the bottom rail 224 are unitarily formed as a single component. For example, the guide 300 and the bottom rail 224 can be injection molded or 3D-printed together, which may provide the advantage of lower manufacturing cost, shorter manufacturing time, etc. In any case, in one embodiment, the guide 300 is static with respect to the bottom rail 224, and the moving panel 180 slides along the guide 300 without causing movement of the guide 300.

As mentioned above, with reference now to FIG. 3B, the window assembly 160 also includes a shoe 310. In one implementation, the shoe 310 slides along the bottom rail 224 to guide the movement of the moving panel 180 along the bottom rail 224 and guide 300. The shoe 310 includes slots, similar to the grooves of the guide 300, that direct the movement of the moving panel 180. In one implementation, the slots include a first slot 340 and a second slot 350. The first slot 340 can be located closer to the second side edge 208 of the fixed panel 170 than the second slot 350, and the second slot 350 can be located closer to the first side edge 206 than the first slot 340. Moreover, in one arrangement, the first slot 340 overlaps the first groove 320, and the second slot 350 overlaps the second groove 330. Further details of the slots 340/350 will be described in further detail below in connection with FIGS. 4A and 4B.

As described in further detail below, in some instances, the shoe 310 moves with respect to the moving panel 180 (e.g., the shoe 310 slides along the bottom rail 224 while the moving panel 180 stays substantially in the same place), and in other instances, the shoe 310 and the moving panel 180 move together (e.g., the shoe 310 pushes or pulls the moving panel 180). As described in further detail below, the bottom cable 228 is connected to the shoe 310, and movement of the bottom cable 228 causes the shoe 310 to slide. Moreover, as described in further detail below, the shoe 310 is provided at least partially on the bottom rail 224. In one example, the shoe 310 is supported by both the guide 300 and the bottom rail 224. Like the guide 300, the shoe 310 can be injection molded, 3D printed, or manufactured in another method. The shoe 310 can be plastic, resin, metal, or another material.

As mentioned above, the slots 340/350, together with the grooves 320/330, cause the moving panel 180 to slide along the bottom rail 224. As such, the moving panel 180 is supported by the guide 300 and within the shoe 310. In one implementation, the window assembly 160 also includes pins attached to the frame 212 that support the moving panel 180 on the guide 300 and enable the moving panel 180 to slide along the bottom rail 224 within the shoe 310. More specifically, in one arrangement, the pins extend through the slots 340/350 and sit within the grooves 320/330. In one implementation, the pins include a first pin 360 and a second pin 370. The first pin 360 and the second pin 370 can be attached to the frame 212 on opposing sides of the moving panel 180. For example, the first pin 360 can be attached to one side of the frame 212 closer to the second side edge 208 of the fixed panel 170 than the second pin 370, and the second pin 370 can be attached to the other side of the frame 212 closer to the first side edge 206 than the first pin 360. In the embodiment shown, moreover, the first pin 360 extends through the first slot 340 and sits within the first groove 320, while the second pin 370 extends through the second slot 350 and sits within the second groove 330. Accordingly, the first pin 360 slides within the first groove 320 and the second slot 350, and the second pin 370 slides within the second groove 330 and the second slot 350. As the moving panel 180 slides along the grooves 320/330 and slots 340/350, the grooves 320/330 and slots 340/350 direct the movement of the moving panel 180 in multiple directions, as noted above. The direction of movement of the moving panel 180 is achieved due to the shapes of the grooves 320/330 and slots 340/350, as described in further detail below in connection with FIGS. 5A and 5B.

Figures 4A, 4B:
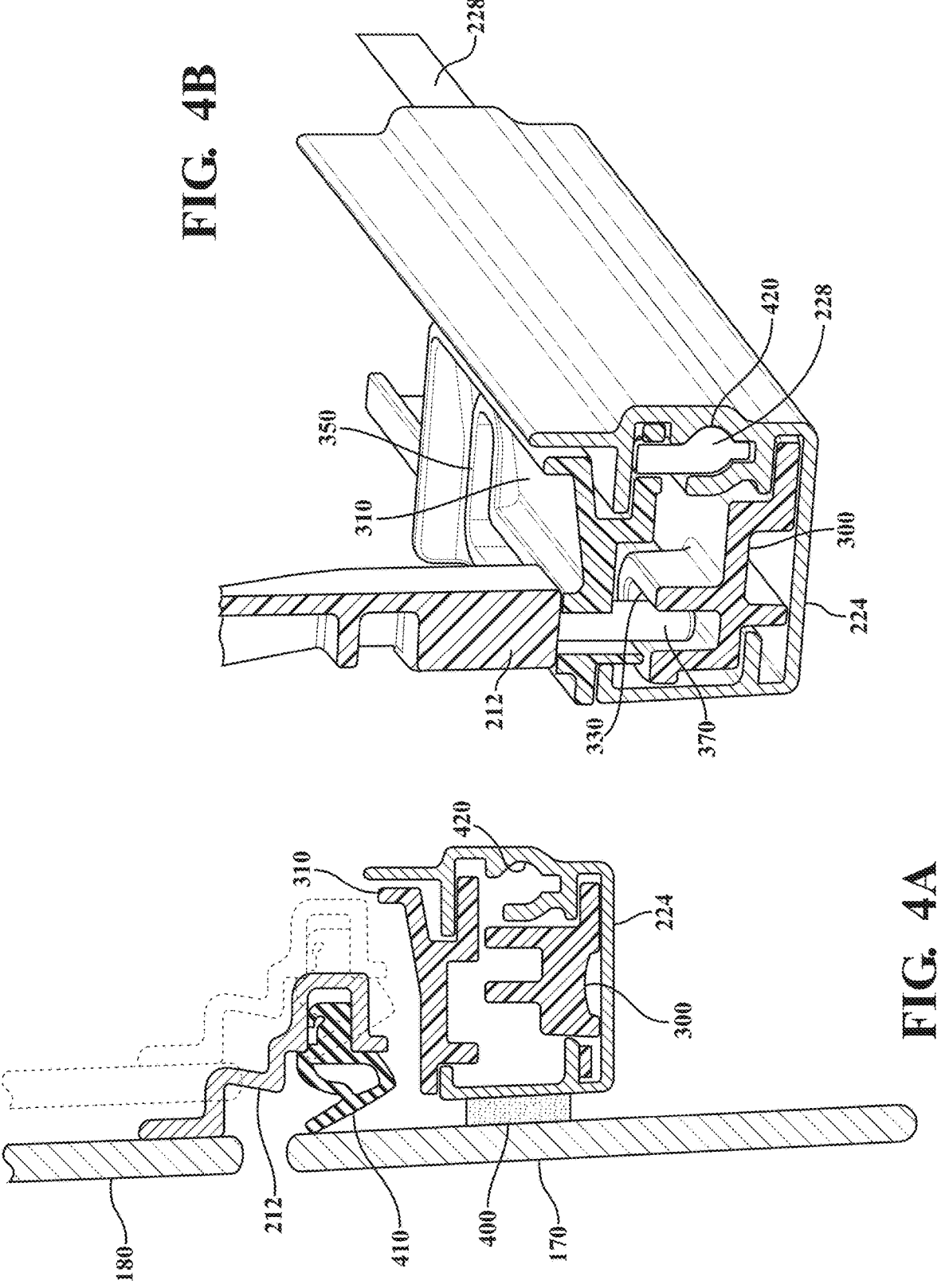
FIG. 4A illustrates one example of a cross-sectional side view of a portion of a window assembly.
FIG. 4B illustrates one example of a perspective view of a portion of a window assembly.

Referring now to FIGS. 4A and 4B, further details of the window assembly 160 will now be described. FIG. 4A shows a side, cross-sectional view along the bottom rail 224, while FIG. 4B shows a perspective view of various components of the drive system. FIG. 4A illustrates one example of an adhesive 400 that attaches the bottom rail 224 to the fixed panel 170. It should be understood that the top rail 222 can be attached to the fixed panel 170 in a similar manner. FIG. 4A also illustrates one example of a weatherstrip 410 for the window assembly 160. The weatherstrip 410 is, in one implementation, attached to the frame 212. As such, and as described above, when the moving panel 180 moves to the closed state to block the opening 190, the weatherstrip 410 substantially seals the gap between the frame 212 and the opening 190, thus substantially preventing air, water, and other environmental elements from entering the vehicle 100 through the opening 190. Further details of the weatherstrip 410 will be described in further detail below.

FIG. 4A also illustrates the moving panel 180 in both the closed, flush position within the opening 190 and the offset position from the fixed panel 170 (shown in dashed lines). As mentioned above, when the moving panel 180 is offset from the fixed panel 170, the moving panel 180 has clearance to slide along the bottom rail 224 to block and unblock the opening 190. Further details of the movement of the moving panel 180 will be described in further detail below.

Referring now to FIG. 4B, one example of the second pin 370 extending through the second slot 350 and sitting within the second groove 330 is shown. FIG. 4B also illustrates a cable channel 420. The cable channel 420 receives the bottom cable 228 and permits sliding of the bottom cable 228 within the bottom rail 224. Sliding of the bottom cable 228 within the bottom rail 224 causes sliding of the shoe 310, as the bottom cable 228 is in contact with the shoe 310.

Figures 5A, 5B:
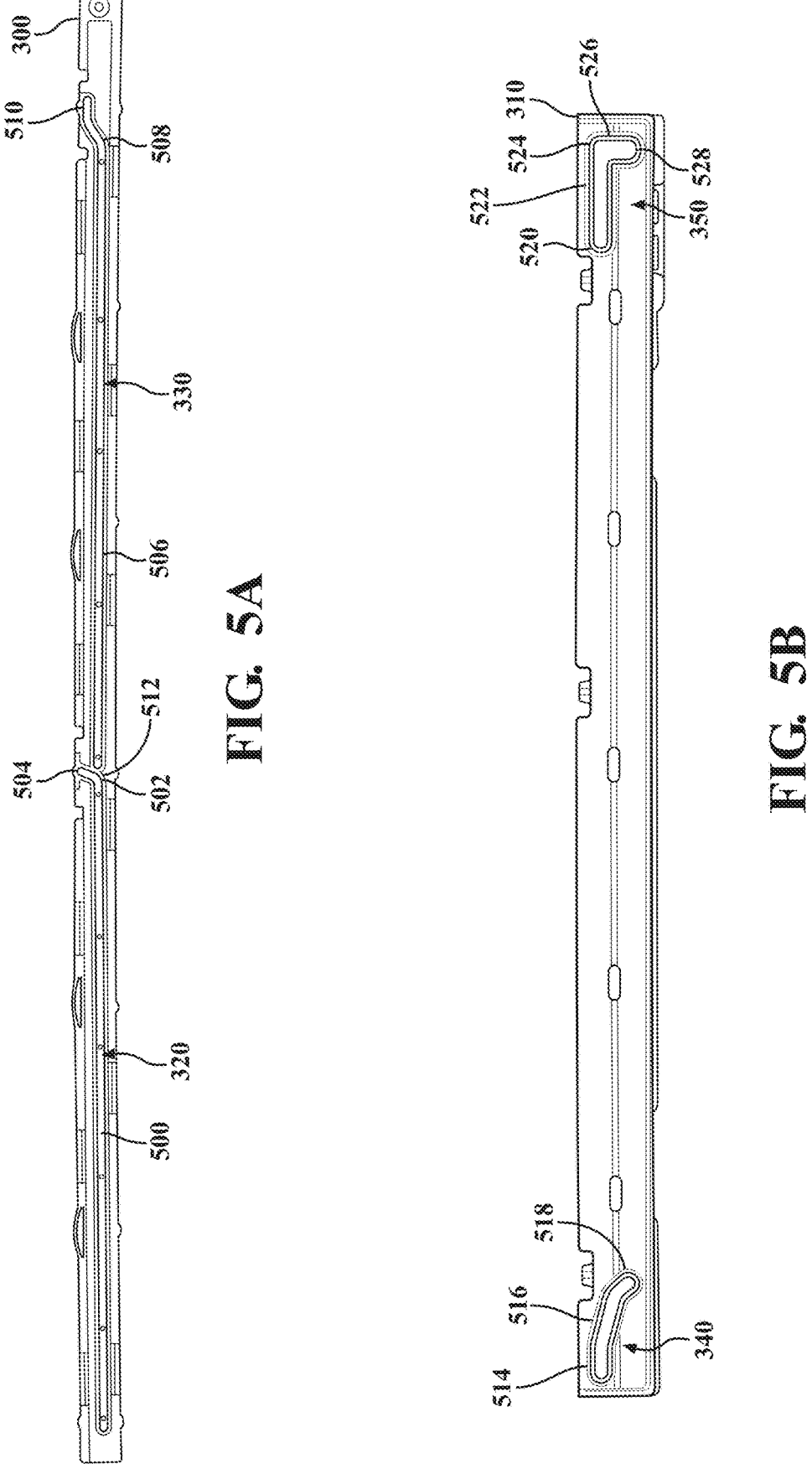
FIG. 5A illustrates one example of a guide for a window assembly.
FIG. 5B illustrates one example of a shoe for a window assembly.

Turning now to FIGS. 5A and 5B, the guide 300 and the shoe 310 are shown individually in greater detail. Referring now to FIG. 5A, as mentioned above, the guide 300 includes a first groove 320 and a second groove 330. The first groove 320 can span generally a first half of the guide 300 (e.g., a half of the guide 300 near the second side edge 208), and the second groove 330 can span generally a second half of the guide 300 (e.g., a half of the guide 300 near the first side edge 206). In one implementation, for example, as shown, the grooves 320/330 define different shapes. In other words, the first groove 320 defines a different shape than the second groove 330. In one example, the first groove 320 is substantially J-shaped, and the second groove 330 is substantially S-shaped. Further details of each shape will now be described.

In one arrangement, the first groove 320 defines a J-leg 500, a J-bend 502, and a J-end 504. In one arrangement, the second groove 330 defines an S-leg 506, an S-bend 508, and an S-tail 510. In one embodiment, for example, as shown, the J-leg 500 is substantially straight and spans most of the first half of the guide 300, and the S-leg 506 is substantially straight and spans most of the second half of the guide 300. As such, the J-leg 500 and the S-leg 506 direct the first pin 360 and the second pin 370, respectively, such that the moving panel 180 moves substantially parallel to the fixed panel 170 as the window assembly 160 moves between the closed state and the open state. Moreover, in one embodiment, the J-bend 502 and the S-bend 508 curve, respectively, from the J-leg 500 and the S-leg 506 toward the fixed panel 170. As a result, the J-bend 502 and the S-bend 508 direct the first pin 360 and the second pin 370, respectively, such that the moving panel 180 moves in both the x-direction and the y-direction. More specifically, as the pins 360/370 move along the J-bend 502 and the S-bend 508 during opening of the window assembly 160, the J-bend 502 and the S-bend 508 direct the pins 360/370, and thus the moving panel 180, away from the fixed panel 170 and the opening 190. Contrariwise, as the pins 360/370 move along the J-bend 502 and the S-bend 508 during closing of the window assembly 160, the J-bend 502 and the S-bend 508 direct the pins 360/370, and thus the moving panel 180, toward the fixed panel 170 and the opening 190.

Referring now to the J-end 504 and the S-tail 510, the J-end 504 and the S-tail 510 are located in a position on the guide 300 such that when the first pin 360 and the second pin 370 are respectively positioned at the J-end 504 and the S-tail 510, the moving panel 180 sits flush with the fixed panel 170 within the opening 190. Furthermore, the J-end 504 and the S-tail 510 are located closer to the fixed panel 170 and the opening 190 than the J-leg 500, J-bend 502, S-leg 506, and S-tail 510. As such, in one implementation, the J-end 504 and the S-tail 510 substantially align with the sides of the opening 190. On the other hand, the J-leg 500 and the S-leg 506 are located farther away from the fixed panel 170 and the opening 190 than the J-end 504 and the S-tail 510. In other words, the J-leg 500 and the S-leg 506 are offset from the fixed panel 170 by a distance. Moreover, the distance between the J-end 504 and the J-leg 500 and/or the distance between the S-tail 510 and the S-leg 506 is, at a minimum, the depth of the fixed panel 170 and the moving panel 180 (in other words, the distance is the minimum amount the moving panel 180 must move in the y-direction to move from the flush-closed position to behind the fixed panel 170). However, some additional distance between the J-end 504 and the J-leg 500 and between the S-tail 510 and the S-leg 506 is advantageous to allow clearance for the moving panel 180 to pass by the fixed panel 170 as the moving panel 180 slides within the grooves. Further details of the J-end 504 and the S-tail 510 will be described in further detail below in connection with FIG. 7.

With continued reference to FIG. 5A, in one arrangement, the guide 300 defines a wall 512 between the first groove 320 and the second groove 330. The wall 512 separates the first grove 320 and the second groove 330 such that the first pin 360 does not slide within the second groove 330 and the second pin 370 does not slide within the first groove 320. The guide 300 can define the wall 512 by way of the injection molding, or the wall 512 can be a separate component attached to the guide 300. Moreover, in one embodiment, the grooves 320/330 have substantially equal depths. For example, the grooves 320/330 can have a depth of a few millimeters, a few centimeters, etc. However, in some instances, the grooves 320/330 do not extend all the way through the guide 300. Moreover, the depths of the grooves 320/330, in one instance, correspond to the lengths of the pins 360/370. Accordingly, in one arrangement, the pins 360/370 define substantially equal lengths as well.

Referring now to FIG. 5B, as mentioned above, the shoe 310 can include a first slot 340 and a second slot 350. In one embodiment, the slots 340/350 extend through the shoe 310 such that the pins 360/370 extend through the shoe 310 and into the guide 300. Moreover, in one arrangement, the first slot 340 and the second slot 350 define different shapes. In other words, the first slot 340 defines a different shape than the second slot 350. In one example, the first slot 340 is substantially C-shaped, and the second slot 350 is substantially L-shaped. The C-shape of the first slot 340 and the L-shape of the second slot 350 can face away from the fixed panel 170. In other words, when viewing the shoe 310 from above and from within the passenger compartment 140 of the vehicle 100, the C-shape and the L-shape are backwards. Further details of each shape of the slots 340/350 will now be described.

Referring now to the first slot 340, in one arrangement, the first slot 340 defines a first C-end 514, a C-curve 516, and a second C-end 518. The first C-end 514, in one embodiment, is closer to the fixed panel 170 than the second C-end 518, and the C-curve 516 bends between the first C-end 514 and the second C-end 518. As the moving panel 180 moves along the bottom rail 224, as the window assembly 160 moves from the closed state to the open state, the C-curve 516 pulls the first pin 360 away from the fixed panel 170 and the opening 190 such that the moving panel 180 tilts away from the fixed panel 170. Tilting the moving panel 180 away from the fixed panel 170 allows the moving panel 180 to move from a flush-closed position within the opening 190 to a position offset from the opening 190 such that the moving panel 180 can slide along the rail to unblock the opening 190. Contrariwise, as the moving panel 180 moves along the bottom rail 224, as the window assembly 160 moves from the open state to the closed state, the C-curve 516 pushes the first pin toward the fixed panel 170 and the opening 190 such that the moving panel 180 tilts toward the fixed panel 170. Tilting the moving panel 180 towards the fixed panel 170 facilitates closing of the moving panel 180 flush against the fixed panel 170 within the opening 190. More details of the first slot 340 will be described in further detail below.

Referring now to the second slot 350, in one arrangement, the second slot 350 defines a first L-end 520, a long arm 522, a corner 524, a short arm 526, and a second L-end 528. The first L-end 520, in one embodiment, is closer to the fixed panel 170 than the second L-end 528. Moreover, in one arrangement, the long arm 522 extends from the first L-end 520 to the corner 524, and the short arm 526 extends away from the fixed panel 170 from the second L-end 528 to the corner 524. In some instances, the long arm 522 is longer than the short arm 526. Additionally, in some instances, the long arm 522 is substantially parallel to the fixed panel 170, while the short arm 526 is substantially perpendicular to the fixed panel 170 and the long arm 522. The various geometries of the second slot 350 serve various purposes during opening and closing of the window assembly 160. For example, the short arm 526 pushes and pulls the second pin 370 during opening and closing of the window assembly 160, thereby pushing and pulling the moving panel 180 along the bottom rail 224. In another example, when the window assembly 160 is in the closed state, the second pin 370 sits within the long arm 522. Because the long arm 522 is substantially parallel to the fixed panel 170, when the second pin 370 sits within the long arm 522 when the window assembly 160 is in the closed state, the long arm 522 prevents the second pin 370 from substantially moving in the y-direction with respect to the fixed panel 170. In this way, the long arm 522 prevents sliding of the moving panel 180 in a direction substantially perpendicular to the fixed panel 170 such that the moving panel 180 is locked against the fixed panel 170 within the opening 190 in the closed state. As a result, if a person or object outside the vehicle 100 were to push on the moving panel 180 in a direction substantially perpendicular to the plane of the moving panel 180, the moving panel 180 would not open.

As just described, the shapes of the slots 340/350 and grooves 320/330 serve various purposes during opening and closing of the window assembly 160. Moreover, the shapes of the slots 340/350 and grooves 320/330 function together to slide the moving panel 180 in multiple directions to change the state of the window assembly 160 between the open and closed states. In addition to the open and closed states described above, the window assembly 160 also has a vented state and a sliding state. In the vented state, the moving panel 180 is tilted away from the fixed panel 170 but is still generally located in a position aligned with the opening 190. In the sliding state, the moving panel 180 is sliding with respect to the fixed panel 170 between the open state and the closed state. Each state of the window assembly 160, along with the movement of the moving panel 180, will be described in further detail below in connection with FIGS. 6A-6E.

Figures 6A, 6B, 6C, 6D, 6E:
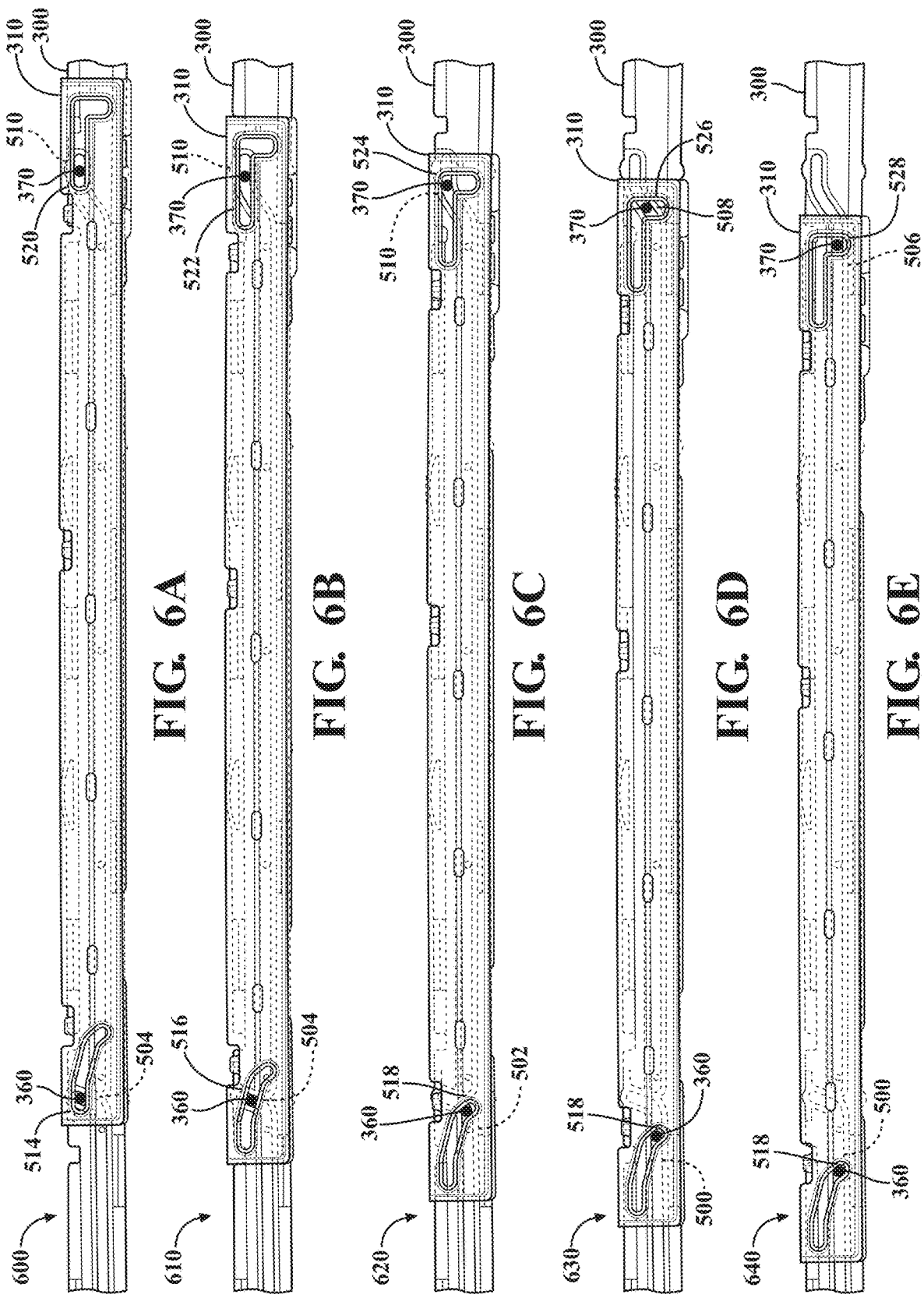
FIG. 6A illustrates one example of a window assembly in a closed state.
FIG. 6B illustrates one example of a window assembly in a first intermediate state.
FIG. 6C illustrates one example of a window assembly in a vented state.
FIG. 6D illustrates one example of a window assembly in a second intermediate state.
FIG. 6E illustrates one example of a window assembly in a sliding state.

Referring now to FIG. 6A, an example of the window assembly 160 in a closed state 600 is shown. In the closed state 600, the first pin 360 is located within the first C-end 514 and the J-end 504, while the second pin 370 is located within the first L-end 520 and the S-tail 510. As a result, in the closed state 600, the moving panel 180 is locked into place flush against the fixed panel 170 within the opening 190, thereby blocking the opening 190.

Referring now to FIG. 6B, FIG. 6B shows an example of the window assembly 160 moving from the closed state 600 to the vented state. In other words, the window assembly 160 is in a first intermediate state 610. In the first intermediate state 610, the shoe 310 has begun to slide along the bottom rail 224 substantially in the x-direction, and the moving glass 180 has not substantially moved from within the opening 190. In the first intermediate state 610, the first pin 360 is moving along the C-curve 516 from the first C-end 514 to the second C-end 518. Moreover, in the first intermediate state 610, the first pin 360 is moving along the J-bend 502 from the J-end 504. Regarding the second pin 370, in the first intermediate state 610, the second pin 370 is sliding along the long arm 522 from the first L-end 520 to the corner 524, and the second pin 370 is located within the S-tail 510. Accordingly, in the first intermediate state 610, the motor 214 is operating to move the bottom cable 228 to slide the shoe 310 along the bottom rail 224, and the shoe 310 slides first before the moving panel 180.

With reference now to FIG. 6C, an example of the window assembly 160 in a vented state 620 is shown. In the vented state 620, the moving panel 180 is tilted away from the fixed panel 170 toward the passenger compartment 140. In other words, in the vented state 620, one side of the moving panel 180 is offset from the opening 190 such that air, water, and other environmental elements can pass through a narrow space between the moving panel 180 and the opening 190 on the side of the moving panel 180 that is tilted away from the fixed panel 170. Accordingly, in the vented state 620, the plane of the moving panel 180 is not substantially aligned with the plane of the fixed panel 170. Instead, the plane of the moving panel 180 is angled from the plane of the fixed panel 170. In the vented state 620, the first pin 360 is located within the second C-end 518 and the J-bend 502, and the second pin 370 is located within the corner 524 and the S-tail 510.

Referring now to FIG. 6D, FIG. 6D shows an example of the window assembly 160 moving from the vented state 620 to the sliding state. In other words, the window assembly 160 is in a second intermediate state 630. In the second intermediate state 630, the second pin 370 is pulled away from the fixed panel 170 in a direction toward the passenger compartment 140. Accordingly, in the second intermediate state 630, the moving panel 180 is pivoted such that the plane of the moving panel 180 is re-aligned and substantially parallel with the fixed panel 170. However, unlike the first intermediate state 610, in the second intermediate state 630, the moving panel 180 is not substantially flush with the fixed panel 170, but rather, is offset from the fixed panel 170. In the second intermediate state 630, the moving panel 180 is sliding in the y-direction and pivoting rather than substantially moving in the x-direction. Accordingly, in the second intermediate state 630, the first pin 360 is located within the second C-end 518 and within the J-leg 500, while the second pin 370 is located within the short arm 526 and the S-bend 508.

Finally, referring now to FIG. 6E, an example of the window assembly 160 in a sliding state 640 is shown. In the sliding state 640, the moving panel 180 is either ready to slide in the x-direction, is sliding in the x-direction, or is located at a position within the J-leg 500 and the S-leg 506 offset from the fixed panel 170 and substantially parallel to the fixed panel 170. In the sliding state 640, the first pin 360 is located within the J-leg 500 and the second C-end 518, while the second pin 370 is located within the S-leg 506 and the second L-end 528. As a result, the second L-end 528 pushes and pulls the moving panel 180 when the shoe 310 is operated to slide along the bottom rail 224.

As shown in FIGS. 6A-6E, the shoe 310 is operated to slide in substantially one direction—the x-direction. In other words, the shoe 310 is operated to slide substantially in one direction along the bottom rail 224. However, as a product of the shapes of the grooves 320/330 and slots 340/350, movement of the shoe 310 in the x-direction causes movement of the moving panel 180 in two directions-both the x-direction and the y-direction. As noted above, as a result, the moving panel 180 can pass along the fixed panel 170 to block and unblock the opening 190, and the moving panel 180 can also slide into the opening 190 to close flush against the fixed panel 170.

Figure 7:
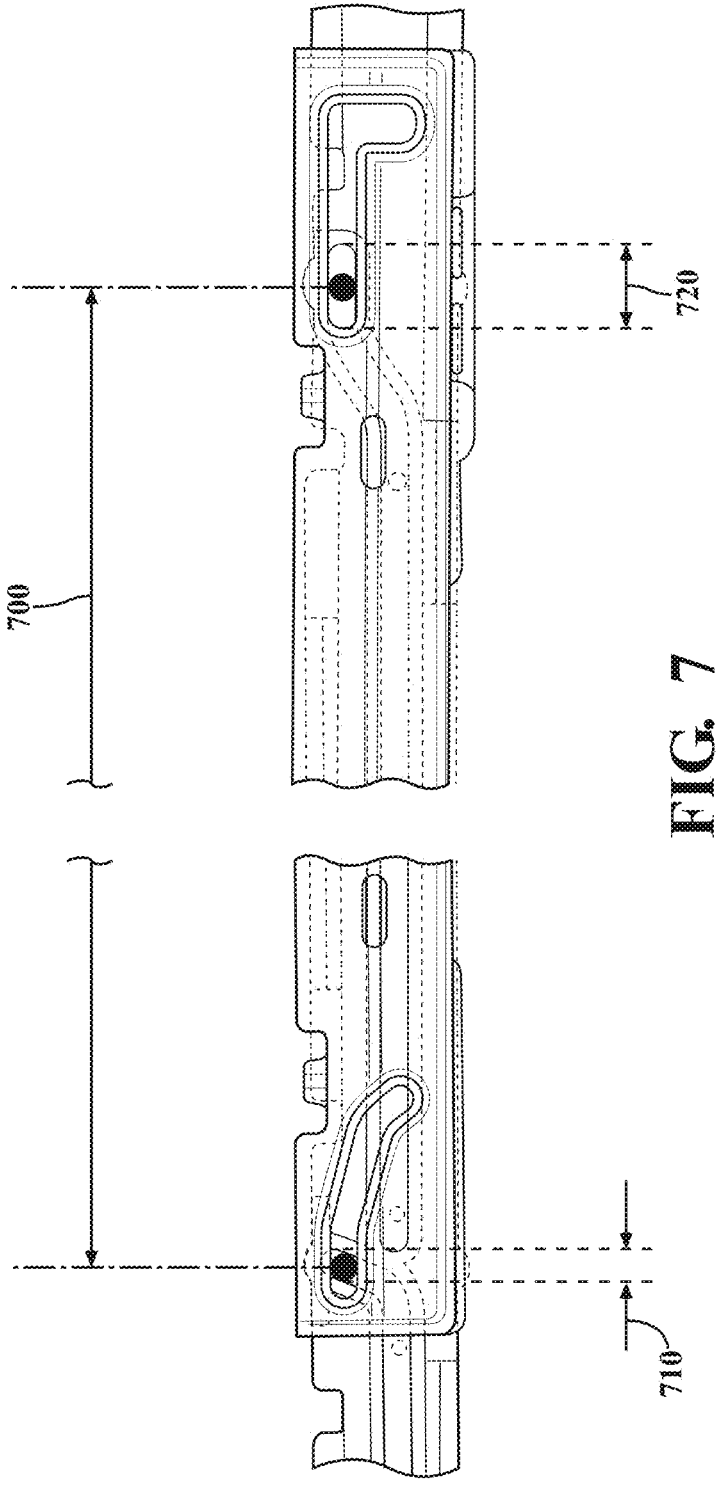
FIG. 7 illustrates one example of pins for a window assembly.

Referring now to FIG. 7, in one embodiment, the first slot 340 and the second slot 350 function together to accommodate manufacturing variability in the window assembly 160. In some instances, manufacturing tolerances are permitted in the manufacturing of one or more components of the window assembly 160. For example, the moving panel 180 defines a moving panel width 700, which may have a tolerance of a few millimeters, for example. Moreover, the weatherstrip 410 may have a tolerance in the thickness of the material of the weatherstrip 410, the width of the weatherstrip 410, etc. In yet another example, the opening 190 also defines a width, which may also have a tolerance. In some instances, when the dimensions of the components of the window assembly 160 fall within these tolerances, the moving panel 180 may not sit perfectly within the opening 190 and flush with the fixed panel 170. This can lead to gaps between the moving panel 180 and the fixed panel 170, allowing air, rain, or other environmental elements to enter the passenger compartment 140, or this can lead to the moving panel 180 not being able to sit fully within the opening 190 to block the opening 190. Accordingly, as mentioned above, the first slot 340 and the second slot 350 are configured to accommodate this variability.

As mentioned above, when the window assembly 160 is in the closed state 600, the first pin 360 sits within the J-end 504 of the first groove 320. The J-end 504 defines a J-end width 710 substantially equal to or only slightly greater than a diameter of the first pin 360. As a result, when the first pin 360 sits within the J-end 504, the first pin 360 does not substantially move within the first groove 320 in the general x-direction. As such, the J-end 504 fixes the position of the moving panel 180 with respect to the fixed panel 170 at a location near the J-end 504. On the other hand, the S-tail 510 of the second groove 330 defines an S-tail length 720. The S-tail 510 extends substantially parallel to the fixed panel 170, and the S-tail length 720 is substantially greater than the J-end width 710 compared to the diameter of the second pin 370. For example, S-tail 510 can have a length of about three times the diameter of the second pin 370. As a result, when the window assembly 160 is in the closed state 600, the S-tail length 720 accommodates various locations where the second pin 370 may sit with respect to the first pin 360, which may be due to the manufacturing variabilities in the moving panel width 700, the width of the weatherstrip 410, the width of the opening 190, etc.

While FIGS. 3A-7 show a bottom portion of the window assembly 160 (e.g., the bottom rail 224, the bottom cable 228, the guide 300, the shoe 310, the pins 360/370, etc.), it should be understood that the window assembly 160 can also include such components on a top portion of the window assembly 160. For example, a second guide and a second shoe can be provided on the top rail 222, the frame 212 can include top pins disposed within grooves of the second guide and slots of the second shoe, and the top cable 226 can cause sliding of the second shoe. In this way, the window assembly 160 can be substantially mirrored in one or more respects about a central, longitudinal axis of the window assembly 160 (e.g., a central axis of the window assembly 160 extending generally in the x-direction). The components on the top portion of the window assembly 160 can function exactly as described with respect to the components shown in FIGS. 3A-7.

The arrangements described herein provide the advantage of a flush-closing sliding window assembly. The flush-closing window assembly enhances the aesthetic appearance of the window assembly, for example, by appearing as one continuous panel rather than two separate panels that are offset from each other. Moreover, the arrangements described herein provide the advantage of sealing the window assembly even when manufacturing tolerances are present in the window assembly components. Finally, the arrangements described herein provide the advantage of a flush-closing sliding window assembly that operates in a smooth manner without binding or sticking of the window assembly components.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-7, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, OR ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/ units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/ units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

In this description, uses of "front," "forward" and the like, and uses of "rear," "rearward" and the like, refer to the longitudinal directions of the vehicle. "Front," "forward," and the like refer to the front (fore) of the vehicle, while "rear," "rearward" and the like refer to the back (aft) of the vehicle. Uses of "side," "sideways," "transverse" and the like refer to the lateral directions of the vehicle, with "driver's side" and the like referring to the left side of the vehicle, and "passenger side" and the like referring to the right side of the vehicle.

Aspects herein can be embodied in other forms without departing from the spirit or essential attributes thereof. Accordingly, reference should be made to the following claims, rather than to the foregoing specification, as indicating the scope thereof.

What is claimed is:

1. A window assembly, comprising:
a fixed panel defining an opening;
a rail that attaches to the fixed panel;
a guide provided on the rail and defining grooves;
a shoe at least partially overlapping the guide and defining slots; and
a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening,
wherein the slots include a substantially L-shaped slot defining a long arm substantially parallel to the fixed panel and a short arm substantially perpendicular to the long arm and facing away from the fixed panel, wherein the long arm prevents sliding of the moving panel in a direction substantially perpendicular to the fixed panel such that the moving panel is locked against the fixed panel in the closed state.

2. The window assembly of claim 1, wherein the slots include a first slot and a second slot including the substantially L-shaped slot, and wherein the first slot and the second slot define different shapes.

3. The window assembly of claim 1, wherein the slots include a substantially C-shaped slot and the substantially L-shaped slot.

4. The window assembly of claim 3, wherein the C-shaped slot and the L-shaped slot face away from the fixed panel.

5. The window assembly of claim 1, wherein the grooves include a first groove and a second groove,
wherein the slots include a first slot overlapping the first groove, and a second slot including the substantially-L-shaped slot and overlapping the second groove, and
wherein the pins include a first pin that slides within the first groove and the first slot and a second pin that slides within the second groove and the second slot.

6. The window assembly of claim 1, wherein the grooves have substantially equal depths within the guide.

7. The window assembly of claim 1, wherein the guide defines a wall between the grooves that separates the grooves.

8. The window assembly of claim 1, wherein the slots include a first slot including a substantially C-shaped slot, and a second slot including the substantially L-shaped slot, wherein the grooves include a first groove including a substantially J-shaped groove, and a second groove including a substantially S-shaped groove, wherein the first slot overlaps the first groove, and the second slot overlaps the second groove, and wherein the pins include a first pin that slides within the first groove and the first slot and a second pin that slides within the second groove and the second slot.

9. The window assembly of claim 1, wherein the grooves include an S-shaped groove defining an S-tail that extends along the guide substantially parallel to the fixed panel and accommodates manufacturing variability in the window assembly.

10. A window assembly, comprising:

a fixed panel defining an opening;

a rail that attaches to the fixed panel;

a guide provided on the rail and defining grooves having substantially equal depths within the guide;

a shoe at least partially overlapping the guide and defining slots including a first slot and a second slot, the first slot and the second slot defining different shapes; and a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening, wherein the slots include a substantially L-shaped slot defining a long arm substantially parallel to the fixed panel and a short arm substantially perpendicular to the long arm and facing away from the fixed panel, wherein the long arm prevents sliding of the moving panel in a direction substantially perpendicular to the fixed panel such that the moving panel is locked against the fixed panel in the closed state.

11. The window assembly of claim 10, wherein the slots include a substantially C-shaped slot and the substantially L-shaped slot.

12. The window assembly of claim 11, wherein the C-shaped slot and the L-shaped slot face away from the fixed panel.

13. The window assembly of claim 10, wherein the grooves include a first groove and a second groove, wherein the slots include a first slot overlapping the first groove, and a second slot including the substantially L-shaped slot and overlapping the second groove, and wherein the pins include a first pin that slides within the first groove and the first slot and a second pin that slides within the second groove and the second slot.

14. The window assembly of claim 10, wherein the guide defines a wall between the grooves that separates the grooves.

15. The window assembly of claim 10, wherein the grooves include an S-shaped groove defining an S-tail that extends along the guide substantially parallel to the fixed panel and accommodates manufacturing variability in the window assembly.

16. A window assembly, comprising:

a fixed panel defining an opening;

a rail that attaches to the fixed panel;

a guide provided on the rail and defining grooves including a first groove and a second groove;

a shoe at least partially overlapping the guide and defining slots facing away from the fixed panel and including a first C-shaped slot overlapping the first groove and a second L-shaped slot overlapping the second groove; and a moving panel supported by the shoe and interacting with the guide by pins that extend through the slots and into the grooves such that the slots, together with the grooves, cause the moving panel to slide within the slots and with respect to the fixed panel between a closed state, in which the moving panel blocks the opening and is substantially flush with the fixed panel, and an open state in which the moving panel unblocks the opening, the pins including a first pin that slides within the first groove and the first slot and a second pin that slides within the second groove and the second slot, wherein the second L-shaped slot defines a long arm substantially parallel to the fixed panel and a short arm substantially perpendicular to the long arm and facing away from the fixed panel, wherein the long arm prevents sliding of the moving panel in a direction substantially perpendicular to the fixed panel such that the moving panel is locked against the fixed panel in the closed state.

17. The window assembly of claim 16, wherein the grooves have substantially equal depths within the guide.

18. The window assembly of claim 16, wherein the guide defines a wall between the grooves that separates the grooves.

* * * * *